United States Patent [19]

Ozawa et al.

[11] Patent Number: 5,151,289
[45] Date of Patent: Sep. 29, 1992

[54] PROCESS OF PREPARING FROZEN INSTANT COOKING NOODLES

[75] Inventors: Ryutaro Ozawa, Saitama; Tomoya Hayakawa, Kawagoe; Noriko Kato, Tokyo; Soichi Kobayashi, Tochigi; Seisaku Fuse, Utsunomiya, all of Japan

[73] Assignees: Nisshin Flour Milling Co., Ltd.; MA MA-Macaroni Co., Ltd., both of Tokyo, Japan

[21] Appl. No.: 631,407

[22] Filed: Dec. 21, 1990

[30] Foreign Application Priority Data

Dec. 28, 1989 [JP] Japan .................... 1-338361

[51] Int. Cl.⁵ .................. A23L 1/162; A23L 3/36
[52] U.S. Cl. .................... 426/557; 426/451; 426/524
[58] Field of Search .............. 426/451, 557, 524

[56] References Cited

U.S. PATENT DOCUMENTS

| | | | |
|---|---|---|---|
| 3,655,401 | 4/1972 | Halik | 426/557 |
| 3,892,874 | 7/1975 | Ando | 426/557 |
| 4,579,746 | 4/1986 | Hirose | 426/524 |
| 4,693,900 | 9/1987 | Molinari | 426/557 |
| 4,871,572 | 10/1989 | Chiu et al. | 426/557 |

Primary Examiner—Jeanette Hunter
Assistant Examiner—Mary S. Mims
Attorney, Agent, or Firm—Oblon, Spivak, McClelland, Maier & Neustadt

[57] ABSTRACT

Frozen instant cooking noodles having a cross-sectional void space percent of 40 to 80% which are capable of uniformly thawing by heat in a very short time to provide a fully cooked noodles having good texture for eating are produced by subjecting noodles to α conversion so as to control a yield of the noodles within the range of 200 to 280%, quickly cooling the α converted noodles in cold water at 0° to 5° C., arranging individual strings of the noodle at random to form a noodle lump and freezing the lump.

10 Claims, 1 Drawing Sheet

PROCESS OF PREPARING FROZEN INSTANT COOKING NOODLES

This invention relates to frozen instant cooking noodles which are capable of uniformly thawing by heat in a very short time to provide a fully cooked noodles having good texture for eating. The invention also relates to a process of preparing said noodles.

BACKGROUND OF THE INVENTION

A change of eating habits is increasing the need for frozen instant cooking noodles which will thaw by heat in a short time to provide a product ready for immediate consumption. As frozen instant cooking noodles are known those obtained by boiling raw or dry noodles and then freezing the boiled noodles.

In general, the frozen noodles are less in extension and lower in elasticity than boiled noodles. However, prior frozen instant cooking noodles have the disadvantages that they cannot be readily thawed uniformly by heat in a short time on account of the tendency of the individual strings or pieces to stick together as soon as they come in touch with one another to form a lump containing less voids between strings. This non-uniform and extended thawing will result in lowering texture for eating and degrading the quality of the noodles.

For obviating those disadvantages, various proposals have been made wherein voids are provided between the strings in the noodle lump to permit a quick and uniform thawing. The prior art includes a process of preparing a frozen noodle which comprises placing the strings of boiled noodle in a vessel having a plurality of small columns protruded from the bottom surface, freezing the vessel, heating it to melt a contact surface of the noodle and container for removal of the noodle from the vessel as disclosed in Japanese Patent Kokoku 47-14897, a process of preparing a frozen noodle by filling a boiled noodle in between small columns of dryice and freezing the noodle as disclosed in Japanese Patent Kokai 50-25747, frozen noodles prepared by stacking a boiled noodle in parallel crosses in a spaced relation to form a plate-like noodle followed by freezing as disclosed in Japanese Utility Model Kokoku 61-38457 and frozen noodles prepared by stacking a cooked noodle in a plate form, while providing vertically through holes at many places thereof followed by freezing as disclosed in Japanese Utility Model Kokoku 63-8228.

However, the prior art has the following disadvantages. The process of Japanese Patent Kokoku 47-14897 is not economical in terms of apparatus and process steps, since it requires a vessel in a complicated shape having a plurality of small columns protruded from the bottom surface and removal of the frozen noodle from the vessel by heating after being frozen. The process of Japanese Patent Kokai 50-25747 is also not economical, since many dryice molded articles are needed to prepare in small columns and operation should be made until the dryice molded article does not sublime. The art of Japanese Utility Model Kokoku 61-38457 requires additional apparatus and much labor, since the noodle strings should be stacked in parallel crosses in a spaced relation. Further the art of Japanese Utility Model Kokoku 63-8228 needs additional steps and much labor, since the through holes should be provided vertically at many places of the noodles after the cooked noodles were stacked in a plate form.

SUMMARY OF THE INVENTION

We have diligently studied in order to obviate the above described disadvantages of the prior art and found that frozen instant cooking noodles being capable of uniformly thawing by heat in a short time and having good texture for eating can be prepared in more simple manner by the steps of subjecting noodles to gelatinization of the noodle starch component (called hereafter "α conversion") so as to control a yield of the noodles (as defined later) within a predetermined range and dividing the α converted noodles into one or more meals of noodle strings under a predetermined temperature followed by freezing to provide more increased cross-sectional void space percent (as defined later) of the noodle lumps.

An object of the present invention is to provide frozen instant cooking noodles which are capable of uniformly thawing by heat in a very short time without deteriorating texture for eating.

A further object of the present invention is to provide a process of preparing commercially easily and economically the frozen instant cooking noodles.

The other objects will become apparent from the following description.

DETAILED DESCRIPTION OF THE INVENTION

In a first aspect the present invention provides frozen instant cooking noodles wherein the noodle lump formed by arranging individual strings of the noodle at random has a cross-sectional void space percent of 40 to 80%.

In a second aspect the present invention provides a process of preparing frozen instant cooking noodles having a cross-sectional void space percent of 40 to 80% which comprises the steps of subjecting noodles to o conversion so as to control a yield of the noodles within the range of 200 to 280%, quickly cooling them in cold water at 0° to 5° C., arranging the strings of the noodle at random to form a noodle lump and freezing the lump.

Figure 1:
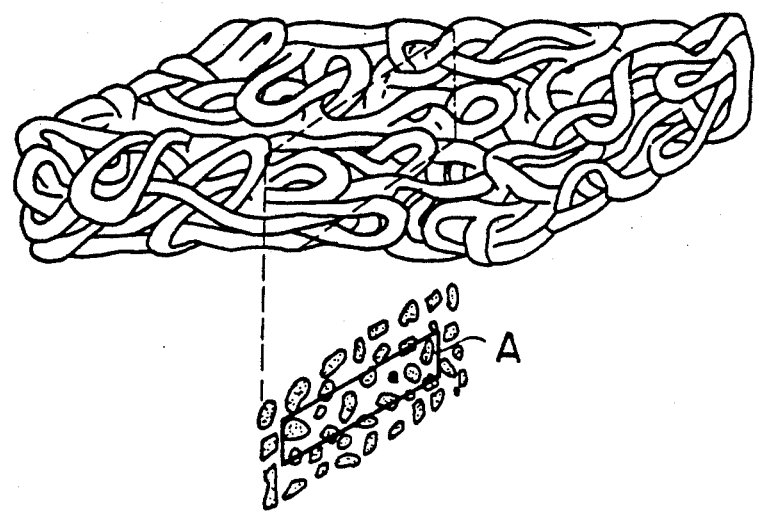
FIG. 1 is a schematic illustration showing cross section (A) taken from the noodle lump for the determination of a cross-sectional void space percent.

The frozen instant cooking noodles of the invention are characterized in that the noodle strings or pieces are arranged at random and loosely entangled together to form a noodle lump having a cross-sectional void space percent of 40–80%. The term "cross-sectional void space percent" as used herein refers to the void space percent as determined and calculated in the following manner. As shown in FIG. 1, a 2 mm×150 mm cross section (indicated at A) taken from substantially the middle part of a rectangular frozen noodle lump is subjected to a topography using an X-ray CT scanner, TOSCANNER 3200 manufactured by Toshiba Co., Ltd. with a scanning speed of 9 sec., voltage of 120 KV and current of 300 mA to determine an X-ray absorption (CT value:CTa) and calculate a cross-sectional void space percent by the following equation.

$$\text{Cross-Sectional Void Space Percent (\%)} = \frac{CTa}{-250} \times 250$$

in which CTa is the value as standardized in the scale by setting the CT value of water at 0 and that of air at −250.

In the present invention it is critical that the cross-sectional void space percent ranges from 40 to 80%. Less than 40% does not achieve a short-time thawing and causes a tendency of non-uniform thawing. More than 80% gives excessive large volume of the noodle lump which is not practical.

The term "arranging the strings of the noodle at random" as used herein means that the noodle strings are arranged in different or irregular directions. If the strings of the noodle are not arranged randomly, the cross-sectional void space percent becomes less than 40% which results in lowering the degree of thawing.

The noodles which can be used in the invention include pastas such as spaghetti, vermicelli, fedellini, capellini, fettuccine, lasagnette and lasagne; Japanese style noodles such as "Udon", "Hiyamugi" and "Somen" made of wheat flour and "Soba" made of buckwheat flour together with or without wheat flour; and Chinese style noodles such as "Lamen". Spaghetti and Chinese style noodle are especially suitable for the invention.

The yield of the noodles is calculated in accordance with the following equation.

$$\text{Yield of noodles (\%)} = \frac{\text{Weight of noodles after } \alpha \text{ conversion}}{\text{Weight of noodles before } \alpha \text{ conversion}} \times 100$$

In the process of the present invention, it is required that the yield of the noodles ranges from 200 to 280%, preferably 210 to 265%. Less than 200% results in that the noodles are too hard on being frozen with poor texture for eating. More than 280% provides lowered cross-sectional void space percent, extended thawing time and non-uniform thawing, which results in poor texture for eating. With 200-280%, especially 220-260% yield for spaghetti, 210-265%, especially 210-245% yield for Chinese style noodle, "Lamen" and 200-260%, especially 230-260% yield for Japanese style noodle, "Udon", frozen instant cooking noodles are produced which have high cross-sectional void space percent, can be thawed in a short time and provide good texture for eating.

In controlling the yield of the noodles to 200-280%, there may be employed any methods conventionally used for the α conversion treatment of the noodles, such as boiling dry or raw noodles in hot water, steaming and other suitable cooking means. In particular, α conversion treatment by boiling in hot water is preferable for providing the instant cooking noodles having good texture for eating.

In the present invention, it is important that the α converted noodles are quickly cooled in cold water at 0°–5° C. This quick cooling results in that the strings of the noodle will more rigidify. In water over 5° C., the strings will soften, which results in decreased voids between the strings, thus not providing desired instant noodles having high void space percent on being frozen. Cooling in water below 0° C. do not achieve the object of the invention, since the noodle strings will freeze before subjecting to freezing treatment.

The method of quickly cooling the α converted noodles in cold water at 0° to 5° C. includes immersing in cold water, spraying with cold water or the like. Immersing in cold water is preferable, since the whole noodles can be quickly cooled to a predetermined temperature and kept at the temperature for a long time. The noodles may be precooled in tap water in a short time prior to quick cooling in cold water at 0° to 5° C.

In the process of the present invention, random arrangement of the noodle strings and formation of the noodle lumps are achieved by the operation of dividing the α converted noodles into a predetermined amount, i.e., one meal (the unit of about 150–300 grams) or more meals. This operation may be carried out manually or mechanically in the atmosphere or water. Advantageously, the operation can be effected using a vessel having both functions of measuring the predetermined amount of noodle strings and shaping into a desired form of the noodle lump, e.g., rectangular, square or circular form. If the vessel has no function of shaping, the measured amount of noodle strings may be placed into a mold vessel having the function of shaping, e.g., square tray.

When the predetermined amount of the noodle strings is taken up by hands and placed into the mold vessel, they have a tendency to align in the same direction. In that case, it is required to rearrange the noodle strings in the mold vessel by hands or instruments so that the strings are arranged randomly.

Figure 2:
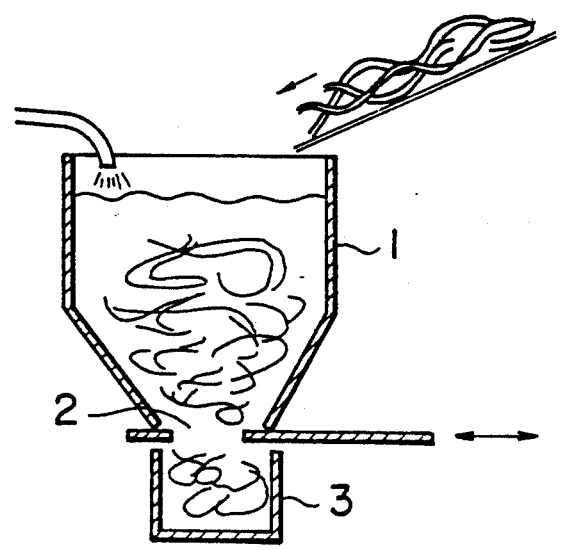
FIG. 2 is a diagrammatic illustration showing an example of the apparatus suitable for the practice of the present invention.

Alternatively, the α converted noodles are charged into cold water at 0°–5° C. and the amount corresponding to one or more meals of the noodles are placed together with cold water into a vessel having a discharge function, while agitating the noodles in the cold water. This permits continuous operation of keeping the noodle strings at a cold temperature, random arrangement of the noodle and formation of the noodle lump. Thus it is very convenient. In the practice of the invention, an apparatus as shown in FIG. 2 is particularly advantageous which comprises a hopper type tank (1) slanting downwardly with reduced diameter and having an agitation function and a periodically opening-closing discharge port (2) at the bottom and a measuring vessel (3) having a discharge function arranged at the lower portion of the discharge port, in which the amount equivalent to one or more meals of the noodle strings is periodically discharged from the discharge port (2) while introducing cold water and the noodle into said tank and agitating them in a random stream, a predetermined amount of the noodle is carefully discharged into the measuring vessel (3) together with cold water and water is drained from the measuring vessel. This apparatus permits the formation of the noodle lumps in which the noodle strings are arranged at random and the cross-sectional void space percent is exceedingly high. In this case, a predetermined amount of the noodle lumps in which the noodle strings are arranged randomly and the cross-sectional void space percent is exceedingly high can be produced automatically by previously controlling the conditions such as the volume of tank (1), the degree of slant at the lower portion of the tank, the amount of introducing cold water and noodle into the tank, the degree of agitation within the tank, the size of discharge port (2), the period of opening and closing of discharge port (2), the volume of measuring vessel (3) and the ability of discharge. The agitation can be carried out by any agitation means such as a water jet type agitation nozzle, an agitation rod and a circulation pump. If necessary, the noodles carefully discharged into the measuring vessel may be transferred into a mold vessel for subjecting to freezing treatment.

In the freezing treatment of the present invention, any methods and apparatus can be employed including those conventionally used in the manufacture of frozen instant cooking noodles. Usually, the noodles may be frozen to a temperature of about −40° C. or lower, stored at a temperature of −20° C. or lower and distributed to market. It is preferred that the noodle lump after freezing has a thickness of about 2 to 4 cm and a length or a diameter of about 9 to 16 cm because of its easiness in thawing and handling.

In eating the instant cooking frozen noodles of the present invention, any methods of thawing and cooking can be employed which includes a method of thawing such as heating in a microwave oven, boiling in hot water and steaming, a method of thawing and cooking the frozen noodles with souse and soup under heat and a method of thawing and cooking by frying the frozen noodles in a hot pan with vegetables, meats, oils, salt and spices, etc.

The time required for thawing will be varied depending on kinds of noodles, size of the noodle lump and temperature of thawing etc. For instance, for the frozen spaghetti (about 2.5 cm thickness) of 250 grams per piece, about 240 to 360 seconds are required in a domestic microwave oven, about 40 to 80 seconds in steaming and about 30 to 60 seconds in hot water at 95°-100° C. to provide good texture for eating.

The frozen instant cooking noodles of the present invention so prepared are capable of uniformly thawing by heat in a short time, free from an elongation of the noodles and unevenness of thawing and have good texture for eating. Furthermore, they can be produced by a very simple process operation which requires no particular apparatus and such complicated steps as employed in the prior art.

The invention will be further illustrated by the following non-limitative examples.

condition. Then the drained noodle in the measuring vessel (3) was weighed into units of 250 grams, which were then placed each in a polyethylene square tray having a dimension of 12 cm by 15 cm by 4 cm depth, upon which the noodle strings were arranged randomly in the tray to form the lumps of the noodle. Immediately, the lumps were quickly frozen at −40° C. and stored at −20° C.

The frozen spaghetti so prepared were each determined for the cross-sectional void space percent and the results are shown in Table 1 below.

Further, the frozen spaghetti so prepared were each thawed by applying thereto water vapor jet at 105° C. in three shots (30 seconds) at 10 minutes intervals using Roundup Steamer VS-200 manufactured by A. J. Antunes Co., Ltd., U.S.A. The thawed portion of the noodle was weighed. The thawing percent was determined by the following equation.

$$\text{Thawing percent (\%)} = \frac{\text{Weight of Thawed Portion}}{\text{Weight of Frozen Noodle}} \times 100$$

The results are shown in Table 1 below.

Further, the frozen spaghetti so prepared were each completely thawed by applying thereto water vapor jet at 105° C. in 6 shots (60 seconds) at 10 seconds intervals using the above steamer. Those thawed noodles were evaluated for the texture for eating. A test panel of 10 persons judges the samples. The rating points are given below.

5: very good elasticity and chewness, very good pleasant on the tongue
4: good elasticity and chewness, good pleasant on the tongue
3: slightly hard and rough or slightly soft with less elasticity, poor pleasant on the tongue
2: slightly hard at the core and slightly rough or too soft with no elasticity, poor pleasant on the tongue
1: hard at the core and rough or too soft with no elasticity, very poor pleasant on the tongue The above points are shown by the average values. The results are tabulated below.

TABLE 1

| Yield (%) | 180 | 190 | 200 | 220 | 240 | 260 | 280 | 290 | 300 |
|---|---|---|---|---|---|---|---|---|---|
| Cross-sectional void space percent (%) | 64 | 60 | 56 | 52 | 49 | 44 | 41 | 36 | 32 |
| Thawing percent (%) | 79 | 79 | 77 | 77 | 75 | 72 | 70 | 64 | 63 |
| Texture for eating | 2 | 3 | 4 | 5 | 5 | 5 | 4 | 3 | 3 |

EXAMPLE 1

3 kg of commercially available spaghetti with 1.7 mm diameter were boiled in 10 times amount of boiling water so as to give a yield shown in Table 1 below. Immediately, the boiled spaghetti was pre-cooled in tap water at 16° C.

The boiled noodle was charged into a 50 liter hopper type tank (1) (bottom inclined at 60°) equipped with an agitation rod shown in FIG. 2 at a rate of 1500 grams/minute and quickly cooled, while introducing cold water at 5° C. into the tank at a rate of 3 liters/minute and agitating by an agitation rod. By periodically opening the discharge port (2) at the bottom of the tank at 1/6 minute intervals such that the residence time of the noodle in the tank was controlled to about 2 minutes, the noodle was discharged together with cold water into a 500 liter measuring vessel (3) with draining means which was provided at the bottom of a discharge port (2), while maintaining the noodle under the agitated The same procedure as in Example 1 was repeated but agitating the noodles in the tank by means of a water jet from nozzle or a water circulation from pump. There was obtained the substantially same result as in Example 1. From this it is found that the differences in the agitation mode of cold water and noodle give no substantial effect on the practice of the present invention.

EXAMPLE 2

3 kg of commercially available dry spaghetti with 1.7 mm diameter were boiled in 10 times amount of boiling water so as to give a yield of 230% (this means that the boiled spaghetti weighed 2.3 times as much as the original weight of the dry one). Immediately, the boiled spaghetti was pre-cooled in tap water at 16° C. for one minute.

In a similar manner as in Example 1, the boiled noodle was charged into a 50 liter hopper type tank equipped with an agitation rod shown in FIG. 2 at a rate of 1500 grams/minute and quickly cooled under agitation, while introducing cold water at a temperature indicated in Table 2 into the tank at a rate of 3 liters/minute and maintaining such condition that the residence time of the noodle in the tank was controlled to about 2 minutes. Then the noodle was periodically discharged from a discharge port (2) together with cold water into a 500 liter measuring vessel (3) with draining means. The drained noodle in the measuring vessel (3) was weighed into units of 250 grams, which were then placed each in the polyethylene square tray in a similar manner as in Example 1. Immediately thereafter, they were frozen at −40° C. and stored at −20° C.

The frozen spaghetti so prepared were evaluated in a similar way as in Example 1. The results are shown in Table 2 below.

cutting blade into a piece of a Chinese style raw noodle, "Lamen" with a dimension of 35 cm by 1.67 mm by 1.40 mm thickness.

The raw noodles were boiled in hot water at 100° C. to a yield shown in Table 4 below and the boiled noodles were pre-cooled by immersing in tap water at 16° C. for 30 seconds.

Those pre-cooled noodles were treated with cold water at a temperature indicated in Table 4 below in a similar manner as in Examples 1 and 2 (except for a residence time of the noodle in tank for one minute), placed into a mold vessel and frozen to prepare a frozen noodle of 200 grams per unit.

The frozen noodles so prepared were evaluated in a similar way as in Example 1. The results are shown in Table 4 below.

TABLE 4

| Yield (%) | 190 | 200 | 210 | 230 | 265 | 280 | 290 | 230 | 230 | 230 | 230 |
|---|---|---|---|---|---|---|---|---|---|---|---|
| Temperature of cold water (°C.) | 3 | 3 | 3 | 3 | 3 | 3 | 3 | 0 | 5 | 7 | 10 |
| Cross-sectional void space percent(%) | 64 | 64 | 61 | 58 | 50 | 41 | 33 | 60 | 57 | 52 | 48 |
| Thawing percent (%) | 89 | 89 | 88 | 86 | 82 | 75 | 64 | 87 | 84 | 82 | 79 |
| Texture for eating | 3 | 4 | 5 | 5 | 5 | 3 | 3 | 4 | 4 | 3 | 3 |

TABLE 2

| Temperature of cold water (°C.) | 0 | 1 | 3 | 5 | 6 | 7 | 10 |
|---|---|---|---|---|---|---|---|
| Cross-sectional void space percent (%) | 54 | 52 | 52 | 50 | 44 | 42 | 39 |
| Thawing percent (%) | 78 | 75 | 75 | 75 | 66 | 65 | 62 |
| Texture for eating | 4 | 5 | 5 | 4 | 3 | 3 | 3 |

EXAMPLE 3

To 100 parts by weight of wheat flour were added 44 parts by weight of saline solution with a Baume degree of 8 and a mixture was kneaded under a reduced pressure of 650 mmHg for 7 to 8 minutes. The kneaded product was rounded and rolled into a sheet. The sheet was cut with a No. 8 cutting blade into a piece of a Japanese style raw noodle, "Udon" with a dimention of 35 cm by 3.75 mm by 2.85 mm thickness. The raw noodles were boiled in hot water at 100° C. to a yield shown in Table 3 and the boiled noodles were pre-cooled by immersing in tap water for one minute.

Those pre cooled noodles were treated with cold water at a temperature indicated in Table 3 below, then placed into a mold vessel and frozen to prepare a frozen noodle of 200 grams per unit.

The frozen noodles so prepared were evaluated in a similar way as in Example 1. The results are shown in Table 3 below.

What is claimed is:

1. A process of preparing frozen instant cooking noodles having a cross-sectional void space percent of 40 to 80% which comprises the steps of:
   subjecting noodles to a α conversion so as to control a yield of the noodles within the range of 200 to 280%;
   quickly cooling the α converted noodles in cold water at 0° to 5° C.;
   arranging individual strings of the noodles at random to form a noodle lump having a cross sectional void space percent of 40 to 80%; and
   freezing the lump.

2. A process of claim 2 wherein α conversion of the noodles is effected by boiling dry or raw noodles in hot water, steaming and other suitable cooking means.

3. A process of claim 1 wherein quick cooling of the α converted noodles is effected by immersing in cold water.

4. A process of claim 1 wherein pre-cooling in tap water is effected prior to quick cooling.

5. A process of claim 1 wherein random arrangement of the noodle strings and formation of the noodle lumps are achieved by the operation of dividing the α converted noodles into a predetermined amount equivalent to one or more meals.

6. A process of claim 5 wherein the operation is effected manually or mechanically in the atmosphere or water.

TABLE 3

| Yield (%) | 190 | 200 | 230 | 260 | 280 | 290 | 230 | 230 | 230 | 230 |
|---|---|---|---|---|---|---|---|---|---|---|
| Temperature of cold water (°C.) | 3 | 3 | 3 | 3 | 3 | 3 | 0 | 5 | 7 | 10 |
| Cross-sectional void space percent (%) | 46 | 46 | 43 | 42 | 37 | 32 | 43 | 41 | 36 | 32 |
| Thawing percent (%) | 70 | 68 | 64 | 61 | 54 | 50 | 65 | 58 | 53 | 51 |
| Texture for eating | 3 | 4 | 5 | 5 | 5 | 4 | 4 | 4 | 3 | 3 |

EXAMPLE 4

To wheat flour were added 1.4% by weight of "Kansui" (an aqueous solution containing potassium carbonate, sodium carobnate, potassium phosphate and sodium phosphate) and 35% by weight of water and a mixture was kneaded under a reduced pressure of 650 mmHg for 7–8 minutes. The kneaded product was rounded, aged for 60 minutes, rolled into a sheet and cut with a No. 18

7. A process of claim 5 wherein the predetermined amount equivalent to one meal of the noodle is a unit of about 150 to 300 grams.

8. A process of claim 5 wherein the operation is effected using a vessel having both functions of measuring the predetermined amount of noodle strings and shaping the noodle strings into a noodle lump in a desired form.

9. A process of claim 5 wherein the operation is effected by discharging noodle strings and cold water into a measuring vessel and then placing the measured noodle strings, into a mold vessel.

10. A process of claim 5 wherein the noodles are selected from Japanese style noodles, Chinese style noodles and pasta.

* * * * *